US009492858B2

(12) United States Patent
Pasquale et al.

(10) Patent No.: US 9,492,858 B2
(45) Date of Patent: Nov. 15, 2016

(54) MULTIPLE TUBE PROCESSING COIL (76) Inventors: Pablo Pasquale, Bessenbach (DE);
Wolfgang Schütz, Biebergemünd (DE)

( * ) Notice: Subject to any disclaimer, the term of this patent is extended or adjusted under 35 U.S.C. 154(b) by 811 days.

(21) Appl. No.: 12/597,748

(22) PCT Filed: Apr. 22, 2008

(86) PCT No.: PCT/DE2008/000691
§ 371 (c)(1),
(2), (4) Date: Jul. 21, 2010

(87) PCT Pub. No.: WO2008/131728
PCT Pub. Date: Nov. 6, 2008

(65) Prior Publication Data
US 2010/0275439 A1 Nov. 4, 2010

(30) Foreign Application Priority Data
Apr. 27, 2007 (DE) ........................ 10 2007 019 971

(51) Int. Cl.
*B21D 26/14* (2006.01)
*B23K 20/06* (2006.01)
(Continued)

(52) U.S. Cl.
CPC .............. *B21D 26/14* (2013.01); *B23K 20/06* (2013.01); *B65B 7/285* (2013.01); *B67B 3/10* (2013.01);
(Continued)

(58) Field of Classification Search
CPC ..................... B21D 26/14; B65B 7/285; B23K 20/06; B67B 3/10; Y10T 29/53417; H01F 7/202
(Continued)

(56) References Cited

U.S. PATENT DOCUMENTS 3,252,313 A * 5/1966 Eilers et al. ...................... 72/56
3,581,456 A * 6/1971 Gere ............................... 53/488
(Continued)

FOREIGN PATENT DOCUMENTS

JP 60-196906 A 10/1985
JP 61-099311 A 5/1986
(Continued)

*Primary Examiner* — David Bryant
*Assistant Examiner* — Steven A Maynard
(74) *Attorney, Agent, or Firm* — Edwin D. Schindler (57) ABSTRACT A multiple tube processing coil for processing two or more elements that are ring-shaped in the processing area thereof, are made of an electrically conductive material and each element tightly encompasses a pressing zone of a mating piece. The multiple tube processing coil includes a pulsed power source and an electric conductor that is connected thereto, entirely surrounds the elements in the processing area thereof and is U-shaped. The two legs of the U-shape are each provided, across from one another, with at least one concavity. The internal edges of the two opposite concavities jointly have a shape that is complementary to the external edge of the cross-section of the elements and is equidistantly enlarged. At least the concavities on the internal faces of the two legs of the U-shape are covered with an electrically insulating layer.

17 Claims, 3 Drawing Sheets (51) Int. Cl.
 *B65B 7/28* (2006.01)
 *B67B 3/10* (2006.01)
 *H01F 7/20* (2006.01)

(52) U.S. Cl.
 CPC .......... *H01F 7/202* (2013.01); *Y10T 29/53417* (2015.01)

(58) Field of Classification Search
 USPC ...... 29/419.2, 422, 458, 505, 509, 507, 512, 29/796; 72/56, 707, 54, 430
 See application file for complete search history.

(56) References Cited

U.S. PATENT DOCUMENTS

| | | |
|---|---|---|
| 3,581,540 A | 6/1971 | Wildi |
| 3,654,787 A * | 4/1972 | Brower ............................. 72/56 |
| 4,531,393 A * | 7/1985 | Weir ................................. 72/56 |
| 5,684,341 A | 11/1997 | Steingroever |
| 6,990,840 B2 * | 1/2006 | Park ................................. 72/56 |
| 7,513,025 B2 * | 4/2009 | Fischer ........................ 29/419.2 |
| 7,540,180 B2 * | 6/2009 | Golovashchenko et al. ... 72/430 |

FOREIGN PATENT DOCUMENTS

| | | | | |
|---|---|---|---|---|
| WO | WO 97/22426 | * | 6/1997 | ............. B21C 26/14 |
| WO | WO 97/22426 A | | 6/1997 | |
| WO | WO 2008/008906 A | | 1/2008 | |

\* cited by examiner

MULTIPLE TUBE PROCESSING COIL

BACKGROUND OF THE INVENTION

1. Technical Field of the Invention

Multiple tube processing coil for processing two or more elements that are ring-shaped in the processing zone thereof, are made of electrically conductive material, and each continuously encompass the pressing zone of a mating piece, said multiple tube processing coil comprising a pulsed power source and an electric conductor that is connected thereto and entirely surrounds the elements in the processing zone thereof.

This method is known as electromagnetic pulse joining. It utilizes the force of a magnetic field to deform axially symmetrical workpieces of conductive material, such as tubes and rings. As a tool for this there serves a coil, through which a current flows and in the interior of which a magnetic field loads the workpiece beyond its flow limit, thereby deforms it and in this way presses it against the surface of the mating piece to the workpiece.

A known application, for example, is to fix a tubular filling nozzle on the neck of a petrol tank by crimping. Another, known application is the production of a tow bar for motor vehicles. To this end, an aluminum tube is joined by electromagnetic pulse joining to two steel coupling pieces.

2. Description of the Prior Art

In this and other applications, a coil surrounds the object, made of electrically conductive material, which is to be deformed, at a small distance. When an electric current flows through this coil, a magnetic field forms, which encloses the element to be deformed, and therein induces eddy currents in its surface, which in turn generate a second magnetic field with a direction opposite to the first, for which reason the two fields repel one another. Thereby, on the circumference of the workpiece, in the plane of the electric coil, a force develops which is oriented radially to the center point of the workpiece.

If this force is large enough to exceed the limit of elastic deformability of the workpiece, it is permanently deformed. Since this limits only needs to be exceeded once and only for a very short time, it is appropriate to use a current source, which emits the energy in pulses, for example a so-called capacitor bank, which consists of a multiplicity of capacitors connected to one another. These capacitors are continuously charged without load and then, via a switch, suddenly connected to a coil, which surrounds the workpiece. In the prior art, current values of 150,000-500,000 amperes are reached. Such high currents discharge the capacitor bank in a very short time, a typical value from the prior art is 45 microseconds.

While the current is flowing, it builds up such a high magnetic flux that the secondary magnetic field generated in the workpiece, which is oriented inversely to the generating primary magnetic field, generates, due to its reaction force, such high forces that the wall of the workpiece is accelerated to peak velocities up to 500 meters per second, and is thereby deformed.

In the process, it is also possible to deform multiple elements, which are inserted concentrically one inside the other and contact one another mutually or are at least at a very small distance from one another. Here, the deforming effect is greatest on the outermost of all the elements.

The nearest, inner element is then principally deformed by the mechanical effect of the outer element. In comparison to this, in most cases, depending on the wall thickness and the mechanical conductivity of the outer element, the magnetic effect on the elements disposed more inwardly is very small or may even lie below the deformation limit, because most of the magnetic energy has already been consumed in the outer element to develop eddy currents.

Therefore, in this manner, elements of another, deformable and non-electromagnetically conducting material, such as plastic, may be introduced within an element of magnetically conductive material. These intermediate rings can be used as simulators or as sealing rings.

However, this, in principle, very simple process has certain problems and restrictions for its successful realization, which are described, inter alia, in U.S. Pat. No. 4,150,274.

Since the internal diameter of the coil should be only slightly larger than the outer diameter of the workpiece, a manufacturer who wants to use the EMPB process requires various examples of the expensive coils.

A further disadvantage is that this coil can only process one workpiece at a time. Since the workpiece must be positioned very accurately in the coil, the feeding and discharge of the device takes much more time than the joining process itself.

Another problem of the prior art is the size of the coil, in particular when multiple workpieces are to be processed simultaneously in one device, the space required by the coils is greater than that for the workpieces.

Another disadvantage is that coils with a multiplicity of windings are advantageous for adapting to the currently available capacitors with typically very high voltages. The disadvantage of such a multi-winding coil, however, is that the individual windings are supported on one another while the current is flowing and must withstand the same high reaction force that causes permanent deformations in the workpiece. That may lead to the conductors of the coil touching one another and thereby stripping off or striking off their insulation, such that short circuits may occur and the coil may become unusable.

Hitherto known coils for the electromagnetic pulse crimping method are generally complicated to manufacture and wear very rapidly compared to other machinery in joining technology.

SUMMARY OF THE INVENTION

Against this background it is the object of the invention to create a coil for processing electrically conductive, axially symmetrical workpieces by means of electromagnetic coils, which is suitable for the simultaneous processing of multiple workpieces, only requires a compact and inexpensive tool for adapting to the respective dimensions of the workpiece, which can be rapidly loaded and unloaded and nevertheless has a long lifetime. As processing, joining, deforming and welding are possible.

As a solution, the invention presents an electromagnetic multiple tube processing coil, in which the electrical conductor is U-shaped, the two legs of which, lying opposite one another, have at least one concavity in each case, the internal edges of the two respectively opposite concavities jointly have a shape that is complementary to the external edge of the cross-section of the element and equidistantly enlarged, and, on the internal sides of the two legs, at least the concavities are covered with an electrically insulating layer.

The most important of the electrical conductor as a coil according to the invention are the concavities, thanks to which the magnetic field for each workpiece, as well as for each individual coil, is uniformly intense around the circumference of the workpiece. With relatively small effort, which is well known in metal processing, all concavities can have precise tolerances such that the joint connections produced therewith also only deviate from one another within the range of a specific tolerance.

For each coil, it is a problem to obtain adequate strength, because the metals that are suitable in principle usually have, with increasing mechanical strength, also poorer electrical conductivity.

DETAILED DESCRIPTION OF THE PREFERRED EMBODIMENTS

The achievement of the invention is to solve this sub-problem in one embodiment of the invention in that the electrical conductor is coated on the opposing internal faces of its legs and on the internal edges of the concavities with a material whose electrical conductivity is higher than the rest of the electrical conductor. This internal layer is thus principally designed for optimum electrical conductivity, while the remainder of the electrical conductor, in addition to its electrical conductivity, also has a high mechanical strength.

The U-shaped electrical conductor can thus be constructed as a so-called "single winding" coil. In comparison to the known state of the EMPF with multi-winding coils, with such a single-winding coil, outwardly directed forces cannot damage, or even short-circuit, the winding by contact with itself. Likewise, forces of repulsion between windings lying one on top of the other, and the wear caused thereby, are not present. In comparison, a single-winding coil is considerably more cost effective, very much simpler to produce, but primarily considerably stiffer and therefore having a longer lifetime.

As a further embodiment, it is conceivable that the electrical conductor is supported by additional elements, which are solely optimized for high mechanical load-bearing.

As an alternative embodiment, the invention proposes constructing the mechanically load-bearing basic structure of the electrical conductor from metal sheets stacked one on top of the other, which are electrically insulated from one another and mechanically strongly bonded to one another. This principle is known, and has proven itself a million fold in, e.g., electrical asynchronous motors. The individual metal sheets are insulated with respect to one another, e.g. by means of a plastic coating and then screwed or riveted to one another in a load-supporting manner. As a result, there is suppression of eddy currents in the interior, which result in significant losses.

Another advantage of this structure is that the interior edges of the electrical conductor can be rapidly and simply adapted to the concavities by means of different shaping, and, by means of a finely stepped structure, can also approximate the beads according to the invention at the level of the processing range.

The gist of the invention is that the electrical conductor is suitable for simultaneous crimping of a plurality of elements. For this purpose, the U-shaped conductor surrounds a plurality of elements; if the legs of this U were rectilinear, they would only contact the cross-section of each element at two opposite points. However, so that the electrical conduct subjects the elements to a uniform magnetic field not only at these two points but also around their entire circumference, it has one concavity in each case for each element, the shape of each concavity corresponding to half the shape of an element. Two respectively opposite concavities thus together form the outer circumference of an element.

Since the element generally has a larger outer circumference before processing than after processing, the concavities are also correspondingly enlarged.

In most cases, the electrical conductor should have yet another small, additional distance from the electrically conductive elements to prevent elements that are not precisely positioned or project beyond the ideal shape from causing a short-circuit.

In addition, however, at least the inside edges of the concavities are further provided with an electrical insulation layer on both sides of the electrical conductor to further increase the voltage resistance. The risk of a flashover is increased in that, for each flanging operation, a short current pulse flows through the electrical conductor with such a high current slew rate that, as a result of back EMF from the eddy currents in the electrically conductive elements and the resulting opposite magnetic field, high voltage spikes are induced in the electrical conductor.

Most elements have a circular cross-section. In this case, the internal edge of the two respectively opposite concavities will also be circular, but with a somewhat larger diameter than the elements. The internal shape of the concavity is thus enlarged in a manner complementary to and equidistant from the shape of the element.

However, when the outer cross-section of the elements departs from the circular shape, then the term equidistant is understood to mean that an identical force acts at all points of the element surface, which pressures the material of the elements together and thereby initiates the crimping operation.

The properties and advantages of a multiple tube processing coil according to the invention are described below with reference to the sealing of containers with a metal cap. The prior art for this is to place the caps on the bottles or other containers to be sealed and to constrict them in the pressure region of the container and thereby bring them to bear against the container so as to form a seal. In this process, the metal is deformed without a temperature change, i.e. cold, which is also termed "crimping".

The disadvantages of this process are the relatively complicated arrangement and fastening of the crimping disk and damage to the caps as a result of sliding movements of the disk on the surface. If in the packaging of pharmaceuticals and highly sensitive foods, sterility must be ensured, it is a disadvantage of this principle that the crimping disk contacts the cap and the sterility of this problem zone requires very high cleaning effort.

Another problem is that a crimping disk, which is guided around the circumference of an element, after 360° meets an already processed regions, as a result of which a no longer desirable further deformation can take place.

For this task, the application of a multiple tube processing coil provides several advantages: The uniformity of the force distribution n the circumference of the cap permits not only the cap to be secured on the container but also a tight seal to be achieved.

As is known, a tight seal can only be achieved if the cap contacts the container on at least one line that leads around the neck of the container and is completely continuous. The extension of this line to an area does not change or improve the seal tightness. The seal only becomes leaky if the line is interrupted. In practice an interruption only forms a very narrow gap, through which neither significant quantities can escape from the container nor can large volumes diffuse from the outside into the container. However, when the container must be sealed in a sterile manner, ideally not a single molecule may pass through the seal line.

This demand is best met with caps that are circular in cross-section. However, it is in principle also conceivable that the outer cross-section of the cap is assembled from various radii. For elliptical cross-sections of the cap, it should be possible to provide a tight seal around the full circumference by crimping.

It is difficult to tightly seal a cap with a rectangular cross-section. Here, the mechanical process with a surrounding crimping disk requires that its guidance is very precisely adapted to the cross-section to be sealed. Otherwise there is the risk that, e.g. very high forces can be applied to the forces but the straight sections between the corners are not adequately deformed. With a multiple tube processing coil according to the invention, too, the cap should have corners rounded with the greatest possible radius.

The crucial innovation of the invention, however, is that for such a shape, the internal edges of the electrical conductor can have a greater distance from the element to be deformed at the corners than at the other regions, as a result of which the deforming force is reduced there and the end effect is a uniform pressure of the cap on the entire circumference. The shape of the concavities in the electrical conductor is thus tailored to the contour of the workpiece.

This example shows that, by means of a multiple tube processing coil according to the invention, identical deformation in the processing region of the cap can be achieved at each point of the circumference. The result of this is that, the term "equidistant" of the main claim does not mean a geometrically identical distance between the "electrical conductor" tool and the "element" workpiece in all cases, but a uniform deformation of the workpiece around the circumference.

In a further optimized embodiment, the invention proposes that one pair of opposite internal edges in each case is deformed as a bead in a radial plane, which is directed towards the processing region of the elements. By this means the magnetic field is focused on the processing region, which improves the efficiency and intensifies the deformation in the processing zone, so that the contact pressure of the element that is still effective in the processing zone after crimping is increased.

The necessity for such a permanent contact pressure force results from the fact that every material in principle has elasticity. Therefore every deforming process—seen geometrically—is always guided such that it "overshoots the mark" because the deformed material subsequently "rebounds" to some extent.

Thus, to seal a container made of a material with very low elasticity, e.g. glass, with a metal cap by crimping, a constriction or notch must surround the pressure region, e.g. around the neck, of the container, into which the metal of the cap is pressed by the crimping operation and after the decay of the magnetic field can also rebound without losing contact with the glass surface in the vicinity of the surrounding notch.

Alternatively, a continuous bead can surround the vessel in a radial plane in the pressing zone. In this case, after the decay of the magnetically generated crimping force, the zones next to the bead act as a rebound path for the metal cap.

Another alternative is to design a bead on the inside of the cap in a radial plane within the processing zone.

In the case of thin-walled vessels, which threaten to fold as a result of the crimping force on the circumference, a plug must be used to receive this force, which can absorb principally the radially acting forces. It is therefore conceivable that this plug can consist of a radially outwardly surrounding cylinder shell, which is supported by numerous radial webs.

An advantage of a plug of this design is that it can remain in the container neck, even when emptying a liquid from the container, since it serves to homogenize the flow emerging from the orifice of the container.

For the use of a single-winding coil, it is usually necessary to interpose a transformer as field translator between the pulse current source and the electrical conductor. This field translator reduces the potential difference between the two legs of the electrical conductor and but increases the current, as a result of which the magnetic flux further increases.

A further subtask is to mechanically design the legs of the electrical conductor such that they cannot be forced apart during the crimping operation. Tension anchors are suitable for this, which can be used in pairs: One tension anchor in each case is arranged above and below the U-shaped conductor and connected to its counterpart via one pressure plate in each case on the end faces of the two legs.

Alternatively or additionally, the two legs can be reinforced by rings or another non-conductive material, which are oriented perpendicular to both legs and can enclose the legs while bearing against them. A suitable fibre material is, e.g., aramid.

In another variant, each leg is reinforced by means of a two-dimensional web bearing against it at the side, which is arranged in the plane of the legs and is widest in the center of the legs. The load-bearing strength of the web is also greatest there. This formation is similar to the supporting structures of bridges, which are highest in the center between the two support points.

In the case of an electromagnet, that is to say in the case of the sealing tool described here as an electrical conductor, the occurrence of a magnetic field is inseparably linked to an electrical current. Therefore, a principle design variant of this electrical conductor is optimization for good electrical conductivity is just as conceivable as alternatively optimization for good magnetic permeability.

For the second variant, the invention proposes coating the internal edges of the concavities in the legs with a material whose magnetic conductivity is higher than in the other regions of the conductor. These coatings of the concavities must be connected to one another from concavity to concavity by the shortest possible connection pieces of a material that is also more magnetically permeable.

Further optimizations result from the type and number of containers that can be sealed in one operation.

When the filling material of the container does not emerge from the container at all, or only to a very small extent, even with the container orifice pointing downward, i.e. when subsequent emptying of the container is only possible by shaking, then it is conceivable also to seal an "upside down" container with a cap by crimping. For this special case, it is conceivable that in one multiple tube processing coil, one half of the container is introduced from above into the electrical conductor and the other half of the container is raised from below into the electrical conductor. In this case, the electrical conductor, as a sealing tool, requires the formation of two beads at a distance from one another within a single concavity.

If the pulse current source is sufficiently powerful, it is appropriate to connect a multiple of electrical conductors to it for a common sealing operation. In this manner, even with comparatively small elements, the power of the electrical source can be utilized to its full extent. In this case, it can be expedient if the entire pulse current source is the center point of the conductors that are connected to it and disposed around it in a stellar arrangement.

In cases where the filling material of the containers permits the containers to be sealed in a position other than with the orifice facing upwards, it is conceivable for a plurality of electrical conductors to be disposed parallel to one another and on a cylindrically shaped plane. In this manner, e.g. for packaging pills in pharmaceutical applications, the feeding of the containers can be better structured.

As a further embodiment of a multiple tube processing coil according to the invention in the application for sealing caps, it is conceivable to plug on a further cap over the tightly closing metal cap, which serves principally for optical improvement. As a result it is not necessary to provide a perfect outer finish of the, now inner disposed, cap, which is made of electrically conductive material. For fastening this outer decorative cover cap, it is appropriate that it has a surrounding bead on its inside, which engages in a depression on the metal cap, which deforms as a result of the crimping. Instead of the surrounding bead, three uniformly distributed detent lugs are also sufficient.

For the variant of the electrical conductor with its concavities, which consist of two different components, namely an outer, also a highly mechanically load-bearing basic structure and an internal, highly conductive layer at least on the internal edges of the concavities, it is conceivable for the manufacture to form this layer and its interconnections by casting a liquid material.

To this end, the invention proposes that the mechanically load-bearing basic structure is supplemented inwardly by means of a negative form that has a complementary shape but is at a uniform distance, and the hollow space between this negative shape and the mechanically load-bearing basic structure is filled by casting. Depending on the chosen design philosophy of the electrical conductor, it is either a material with particularly high electrical conductivity or particularly high magnetic permeability. The principle of such a process is known and has proven itself a million fold in three-phase asynchronous motors, but is new for multiple tube processing coils.

For sealing containers with caps of electrically conductive material by means of a multiple tube processing coil according to the invention, the following process results. If the container is relatively thin walled, it is filled with a plug in the zone to be sealed. Then, a cap is pushed over the orifice of the container to be sealed to the extent that the processing zone of the cap is disposed at the level of the pressing zone of the container. In the next step, the container prepared in this manner, with its cap, is introduced into one of the concavities of the electrical conductor to the extent that the processing zone of the cap is located at the level of the internal edge of the concavities of the electrical conductor. Then, in the next step, a current is caused to flow through the electrical conductor, whereupon the magnetic field induces an current in the electrical conductor, which generates a second magnetic field, which is oriented opposite to, and is repelled by, the first magnetic field. By this means a force is exerted on the electrical conductor as well as on the cap. Since the electrical conductor is so stably dimensioned that it can withstand these reaction forces, the reaction force acts to its full extent on the processing zone of the cap and deforms it at very high velocity.

In practice, the current flux is usually terminated in that the electrical energy stored in the pulse current source has flowed out, thus in general in that the capacitors have discharged. Thereby the current flow also terminates, so that the magnetic field collapses, too. After a time of typically about 45 microseconds, the crimping operation is completed:

The decisive advantages of this type of crimping are the contactless action of the force, consequently no contamination by direct contact with the tool, no damage of the surface by contact with tools, no heating of the edge zones, uniform distribution of the crimping force and thereby a uniform bearing of the inside of the cap against the outer surface of the container, which results in a tight seal.

While an already sealed container is being removed from the closing device, and the next is being introduced into the multiple tube processing coil, the capacitors are recharged. A similar principle of energy supply is known in routine practice from the flashlight of cameras; here, too, the illumination time is orders of magnitude shorter than the charging time, because, by the same principle, energy is temporarily stored in capacitors.

The above described embodiments of a multiple tube processing coil according to the invention have rectilinear legs of the electrical conductor. However, angled or curves legs are also possible, which, e.g., permits a simplified fitting of the coil in an existing machine for retrofitting existing production systems.

A multiple tube processing coil according to the invention can—as described above—be very advantageously used for crimping aluminum caps on glass bottles or ampoules. However, the principle is also applicable for joining, deforming and atomic welding of tubular and/or axially symmetrical structures. The element to be processed must always be approximately annular in the subzone to be processed and be made of conductive material. For the remaining zone of the element, however, the shape and material are completely optional. Thus, hollow elements such as bottles or drums can be processes, but also other parts that have an approximately annular conductive zone.

BRIEF DESCRIPTION OF THE DRAWING FIGURE

Further details and features of the invention are explained below in greater detail with reference to examples. However, they are not intended to limit the invention but only explain it. In schematic view.

DETAILED DESCRIPTION OF THE DRAWING FIGURE

Figure 1:
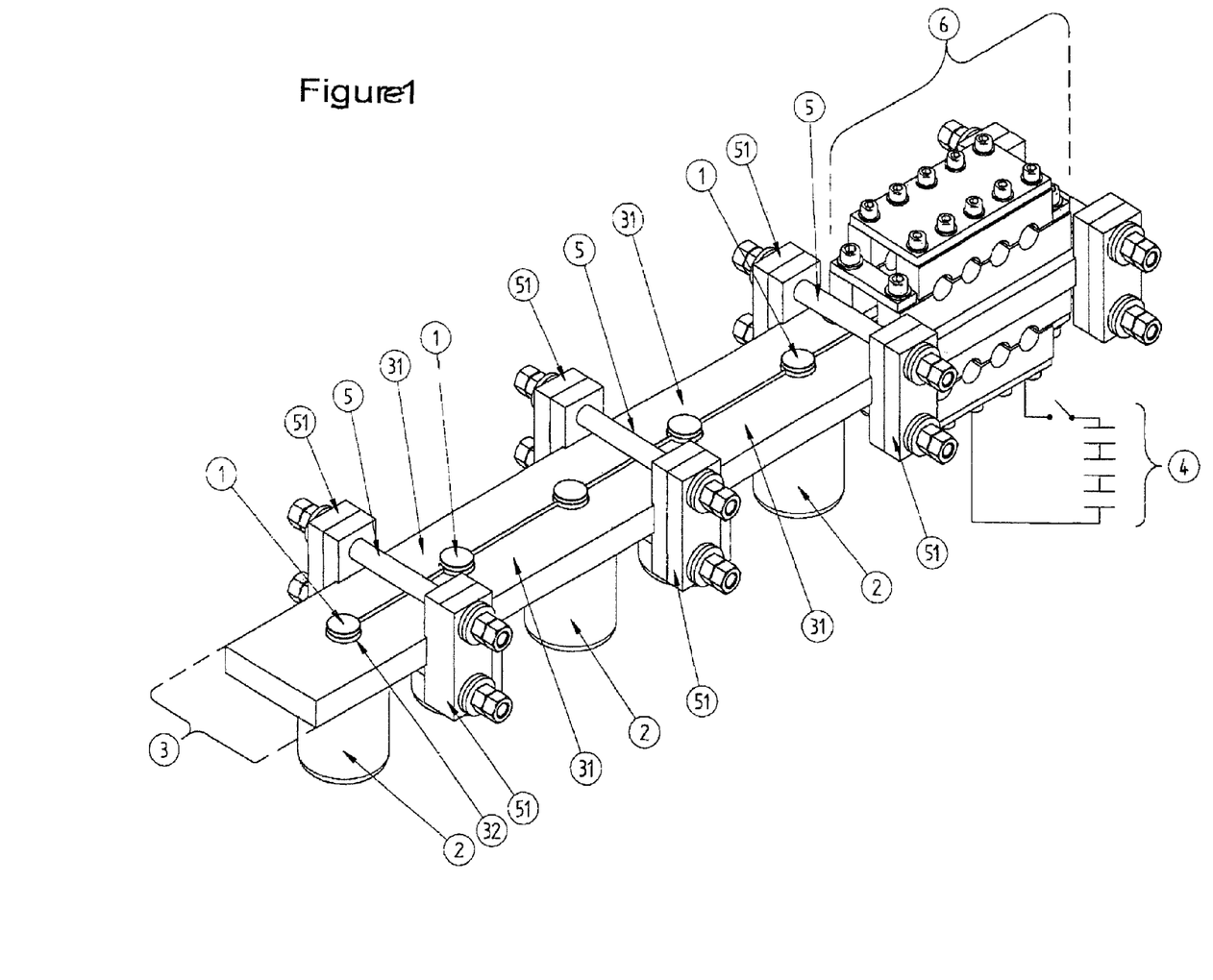
FIG. 1 shows a skew projection of an electrical conductor with tanks, tension anchors and field transfer

In detail, the drawing figures show:

FIG. 1 shows the skew projection of an electrical conductor 3, the two legs 31 of the field translator 6 extend, top right in the figure, to the connecting point of the two legs 31, below left in the figure. The field translator 6 is the intermediate link between the electrical conductor 3 and the pulse current source 4, which is only shown diagrammatically in FIG. 1 with its electrical replacement circuit diagram, here consisting of three capacitors connected in series, which can be connected to the field translator 6 via a switch. The circuit for charging the capacitors is not shown in FIG. 1.

When the switch is closed, the charge stored in the capacitors flows via the field translator 6 into a leg 31 of the electrical conductor 3, downward to the connecting point of the two legs 31 and in the other leg 31 back to the field translator 6. In the process, this current also passes through the concavities 32 in the electrical conductor 3, of which only one concavity is designated 32 below left in FIG. 1. During the current flux, the energy stored in the capacitors serves for deforming the caps 1 and covers the losses on the transmission path, that is to say inter alia in the field translator 6 and in the electrical conductor 3.

In FIG. 1, it can be seen that, for the deforming effect in the narrow interspace between the two legs 31 of the conductor 3 and in the concavities 32, a magnetic field is generated by the electrical current. Since the magnetic field in the two legs 31 of the conductor 3 is oriented in the same direction, it generates a force that pushes apart the two legs 31. For the compensation thereof, tension anchors 5 are provided laterally to the legs 31, which are arranged in pairs above and below the legs 31 and are connected to one another via pressure plates 51, which bearing on the end faces of the legs 31. The exemplary embodiment in FIG. 1 shows a total of 4 pairs of tension anchors.

Of the five containers 2 illustrated, the lower part projects downward beyond the electrical conductor 3. On the top side, the cap 1 can be seen, which projects upward beyond the electrical conductor 3. A more accurate view of this zone is given by FIGS. 2 and 3.

Figure 2:
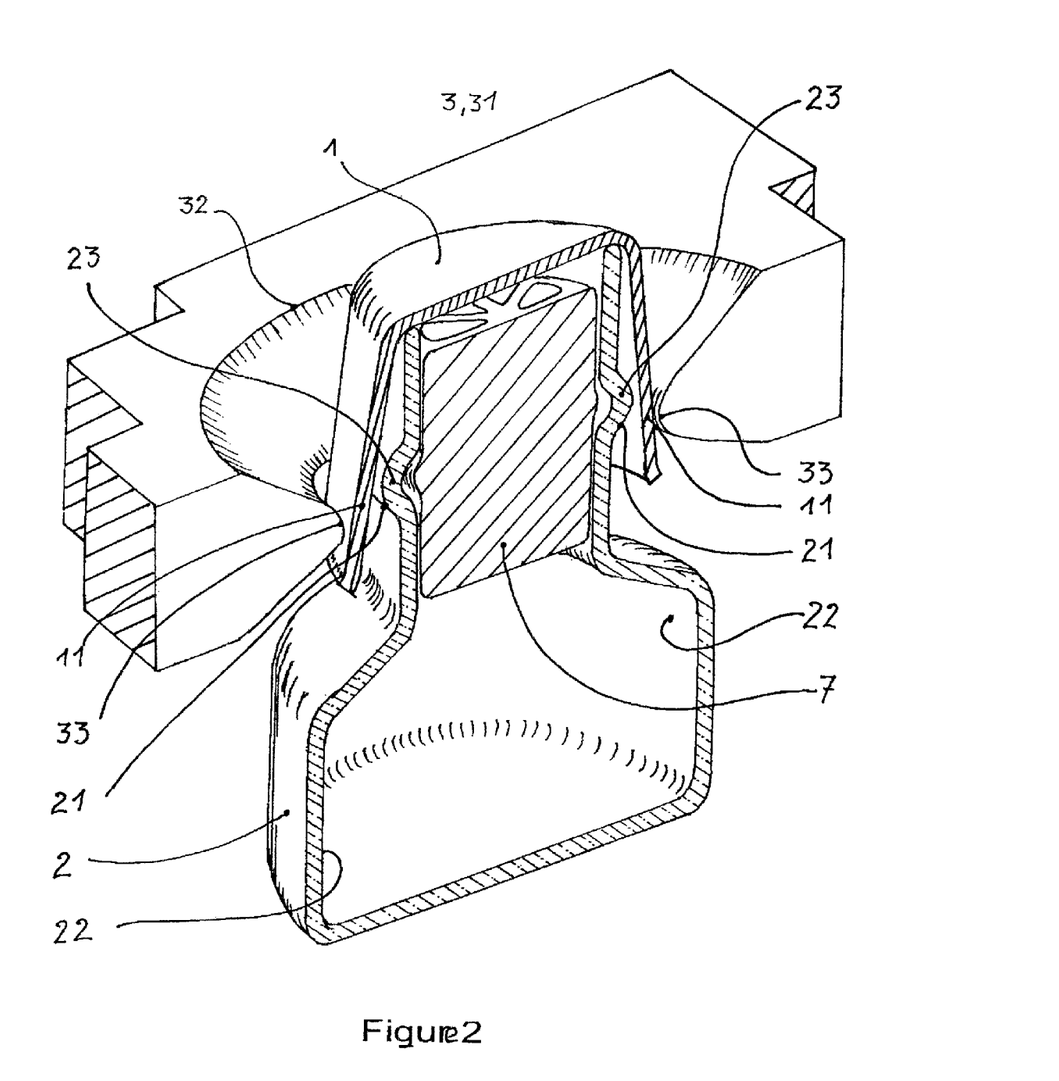
FIG. 2 shows a section of a leg of the electrical conductor with a vertically section through the container before crimping
Figure 3:
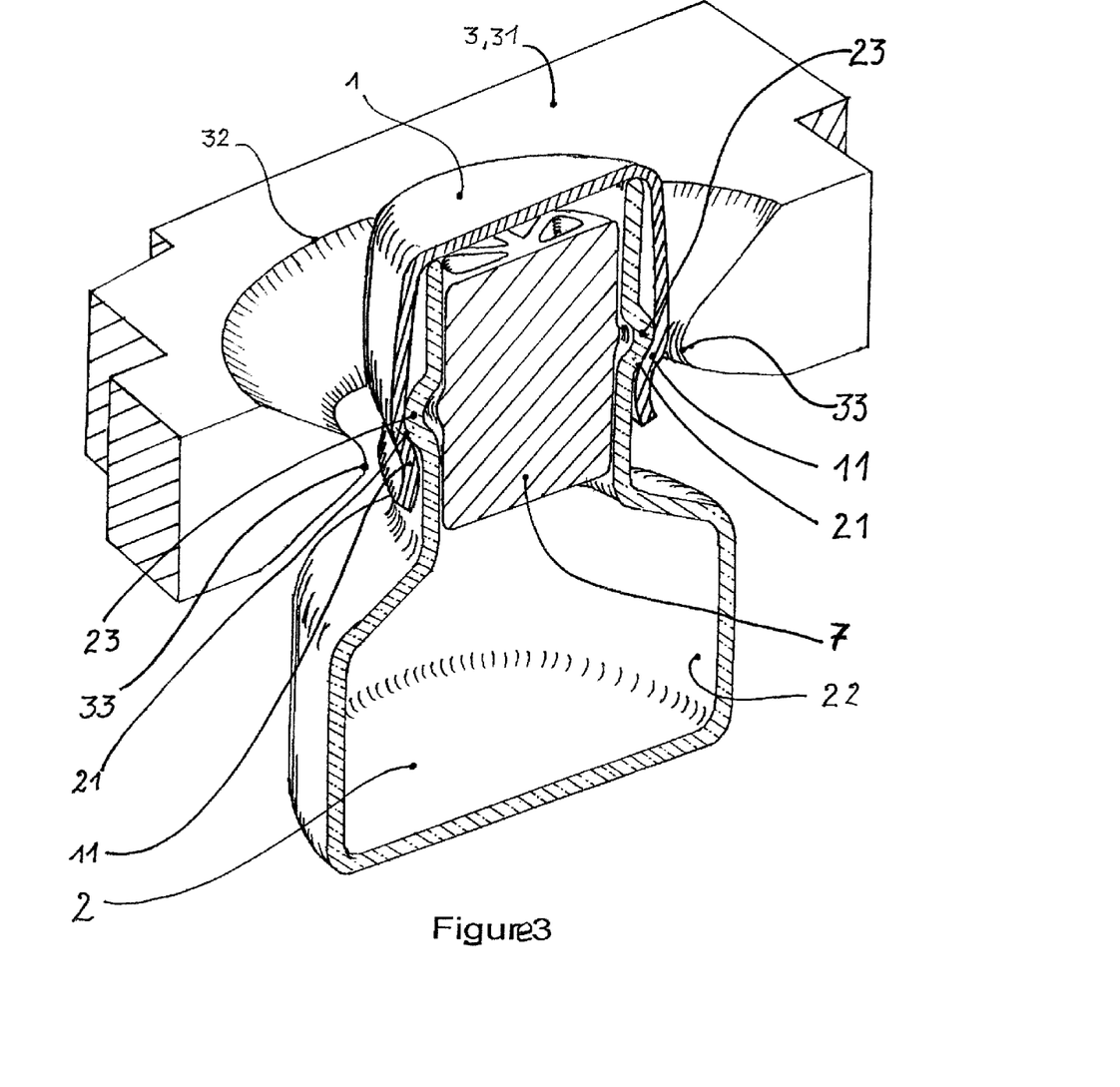
FIG. 3 shows the same view as FIG. 2, but after crimping.

FIG. 2 gives a three-dimensional view of a section of the leg 31, which can be seen in FIG. 1 in the rear zone. This leg 31 contains the concavity 32, the internal edge 31 of which is designed as a bead that is located at the level of the processing zone 11 of the cap 1 and of the pressing zone 21 of the container 2. On the container 2, the cap 1 is mounted and contacts it only at the upper edge. The side walls of the cap 1 are not yet in contact with the container 2, rather a gap is visible between the pressing zone 21 of the container 2 and the processing zone 11 of the cap 1. In the upper zone of the bottle, in its neck, the plug 7 is inserted in the orifice of the container 2. On its top side, a plurality of approximately circular sector-shaped orifices, which extend downwards. Between these orifices are formed the web-like walls, which extend from the outer zone of the plug 7 to its center point and ensure the stiffening of the plug 7 in the radial direction. This makes it clear that the plug 7 is not intended as the closure of the container 2, but only to receive the radial forces on the container 2 produced during closing. FIG. 3 shows, as skew projection, the same section of a leg 31 of the electrical conductor 3 and the same cross-section through a container 2 as shown in FIG. 2, but in this case after crimping of the cap 1. In FIG. 3, it can be seen that the processing zone 11 of the cap 1 now bears against the pressing zone 21 of the container 2 below the bead 23. At the lower end of the cap 1, the edge of the cap bulges outwardly somewhat in order to avoid damaging the container 2 by the lower edges of the cap 1 during the crimping operation. In FIG. 3 it can be seen that the cap 1 only bears against the container 2 in a very narrow region, namely the pressing zone 21. The processing zone 11 of the cap 1 also extends over this zone and over a narrow strip below it.

In FIG. 3 it is made clear that the magnetic field, which is generated by the conductor 3, should appropriately focus on this processing zone 11. To this end, the internal edges 33 of the concavity 32 are deformed in the manner of a bead and the container 2 is positioned in the vertical direction such that the internal edge 33 is at the level of the processing zone 11.

In FIG. 3, below the surrounding bead 23 on the container, it can be seen that the processing zone 11 does not bear against the cap 1, but is at a small distance from the container 2.

This distance is the result of the "rebound" of the metal cap out of the conductor 3 when the magnetic field is switched off. However, it is also made clear that the upper portion of the processing zone 11 of the cap 1 is pressed on a small width on the pressing zone 21 of the container 2, whereby a sealing line that is continuous around the entire circumference is produced at this level.

LIST OF REFERENCE CHARACTERS

1 Cap for sealing the container 2
11 Processing zone of the cap 1
2 Container to be sealed by means of cap 1
21 Pressing zone of the container 2
22 Internal zone of the container 2
23 Bead in the pressing zone 21
3 Electrical conductor, surrounds cap 1
31 Leg of the conductor 3
32 Concavity in the internal edge of conductor 3
33 Internal edge of conductor 3
4 Pulse current source connected to electrical conductor 3
5 Tension anchor keeps the legs 31 together
51 Pressure plate bears on the end face of a leg 31, joints to tension anchors 5 together
6 Field translator between the pulse current source 4 and conductor 3
7 Plug, fills the container in the pressing zone 21

The invention claimed is:

1. A method for sealing a container with a cap via a multiple tube processing coil for processing the container and cap, the cap being ring-shaped in a processing zone thereof, made of an electrically conductive material, and adapted continuously encompass a pressing zone of the container, said method comprising the steps of:

providing a multiple tube processing coil including a pulsed power source and an electric conductor, said electric conductor being formed as a single, solid structure connected to said pulsed power source and being substantially shaped as a "U" with the two legs of the "U"-shape each generating a magnetic field oriented in a same direction creating opposing magnetic forces between the two legs and with the two legs being provided with a plurality of concavities opposite one another, the two legs of the U-shape being substantially immovable relative to one another due to the single, solid structure of said electric conductor, wherein internal edges of two mutually opposing concavities jointly have a shape that is complementary to an external edge of a cross-section of said cap, and on internal faces of the two legs of the "U"-shape or of the concavities is disposed an electrically insulating layer for providing a uniform magnetic field, said container for said multiple tube processing coil being shaped for insertion at one end of said container into one of the concavities defined by the substantially immovable two legs opposed to one another of the single, solid structure of the "U"-shape of said electric conductor;

inserting a plug into an orifice of the container adjacent the pressing zone of the container;

pushing a cap over the orifice of the container to the extent that the processing zone of the cap is disposed at a level of the pressing zone of the container;

positioning said container with the plug and cap of caps is introduced into one of the concavities of the electrical conductor to the extent that the processing zone of the cap is located at a level of the internal edges of the electrical conductor;

flowing a current pulse through the electrical conductor, such that a magnetic field is created in the processing zone via the internal edges of the electrical conductor, sufficient to reduce a diameter of the cap from a first predetermined diameter to a second predetermined diameter, wherein the cap is in sealed contact around an entire circumference of the container;

preventing collapse of the container via the plug being situated radially inward from the cap, at the level of the processing zone, the plug being sufficiently rigid to withstand the compressive force of the magnetic field and maintain the container in its original form as the cap is reduced in diameter;

leaving the plug in place within the container after the cap is secured and the magnetic field is switched off, the plug allowing flow of a fluid within the container upon removal of the cap via a plurality of orifices in the plug; and, removing from a vicinity of the electrical conductor the sealed container.

2. The method for sealing a container with a cap via a multiple tube processing coil according to claim 1, wherein said external edge of the cross-section of each said cap is circular and wherein each of the two concavities assigned to said cap has a semicircular shape with a radius which is slightly larger than an outer radius of said cap.

3. The method for sealing a container with a cap via a multiple tube processing coil according to claim 1, wherein at least one pair of opposite said internal edges is shaped as a bead in a radial plane oriented to the processing zone.

4. The method for sealing a container with a cap via a multiple tube processing coil according to claim 1, wherein the container has, on its external edge, in at least one radial plane within the pressing zone, a continuously surrounding bead.

5. The method for sealing a container with a cap via a multiple tube processing coil according to claim 1, further comprising the step of:
inserting a transformer as a field translator between the electrical conductor and the pulsed power source.

6. The method for sealing a container with a cap via a multiple tube processing coil according to claim 1, further comprising the step of:
coating the electrical conductor on mutually opposite internal faces of its legs and on the internal edges thereof with a material having an electrical conductivity that is higher than in other regions of the electrical conductor.

7. The method for sealing a container with a cap via a multiple tube processing coil according to claim 1, further comprising the step of:
coating the electrical conductor on the mutually opposite internal faces of its legs and on the internal edges with a material having a mechanical strength that is lower than in other regions of the electrical conductor.

8. The method for sealing a container with a cap via a multiple tube processing coil according to claim 1, wherein said electrical conductor comprises metal sheets electrically insulated from one another and mechanically bonded to one another.

9. The method for sealing a container with a cap via a multiple tube processing coil according to claim 1, wherein the two legs of the U-shape of the electrical conductor are stiffened by a pair of tension anchors, of which one tension anchor of said pair of tension anchors is arranged above and below the U-shape of the electrical conductor.

10. The method for sealing a container with a cap via a multiple tube processing coil according to claim 1, wherein the two legs of the U-shape of the electrical conductor are reinforced by rings of a non-conductive material oriented perpendicularly to the two legs and enclosing the two legs while bearing against them.

11. The method for sealing a container with a cap via a multiple tube processing coil according to claim 1, wherein each of the two legs of the U-shape of the electrical conductor are reinforced by a planar web bearing laterally against each of the two legs with the planar web for each of the two legs arranged in a plane of the two legs and widest in a central region of the two legs.

12. The method for sealing a container with a cap via a multiple tube processing coil according to claim 1, further comprising the step of:
coating the internal edges with a material having a magnetic permeability that is higher than in other regions of the electrical conductor and within each leg of the two legs.

13. The method for sealing a container with a cap via a multiple tube processing coil according to claim 1, wherein said plurality of electrical conductors are provided in a parallel arrangement to one another and on a cylindrical surface.

14. The method for sealing a container with a cap via a multiple tube processing coil according to claim 1, wherein the two legs of the U-shape of the electrical conductor are curved.

15. The method for sealing a container with a cap via a multiple tube processing coil according to claim 1, wherein said container is a hollow article with a substantially ring-shaped zone.

16. The method for sealing a container with a cap via a multiple tube processing coil according to claim 1, wherein said container is an axially symmetrical structure.

17. The method for sealing a container with a cap via a multiple tube processing coil according to claim 1, further comprising the step of:
coating the internal edges with connections of a coating being formed by casting into openings in a mechanically load-bearing structure of the electrical conductor and by casting into a space between the internal edges and a negative shape of the internal edges, which is complementary thereto.

* * * * *